United States Patent
Fu et al.

(10) Patent No.: US 12,523,665 B2
(45) Date of Patent: Jan. 13, 2026

(54) IN-FIELD COLOUR TEST FOR SCREENING FENTANYL AND ANALOGUES THEREOF

(71) Applicant: University of Technology Sydney, Ultimo (AU)

(72) Inventors: Shanlin Fu, Ultimo (AU); Ronald Gibrail Shimmon, Ultimo (AU); Mélanie Zoe Lauria, Ultimo (AU); Joshua Charles Klingberg, Ultimo (AU); Laura Jane Clancy, Ultimo (AU)

(73) Assignee: University of Technology Sydney (AU)

( * ) Notice: Subject to any disclaimer, the term of this patent is extended or adjusted under 35 U.S.C. 154(b) by 672 days.

(21) Appl. No.: 17/911,501

(22) PCT Filed: Mar. 19, 2021

(86) PCT No.: PCT/AU2021/050256
§ 371 (c)(1),
(2) Date: Sep. 14, 2022

(87) PCT Pub. No.: WO2021/184082
PCT Pub. Date: Sep. 23, 2021

(65) Prior Publication Data
US 2023/0349935 A1    Nov. 2, 2023

(30) Foreign Application Priority Data

Mar. 20, 2020 (AU) .................. 2020900865

(51) Int. Cl.
*G01N 33/94* (2006.01)
*G01N 21/78* (2006.01)

(52) U.S. Cl.
CPC ......... *G01N 33/9486* (2013.01); *G01N 21/78* (2013.01)

(58) Field of Classification Search
CPC .... G01N 33/9486; G01N 21/78; G01N 33/52; G01N 33/58; C07C 233/36; C07C 231/12
See application file for complete search history.

(56) References Cited

PUBLICATIONS

Vespalec et al "Behaviour of dihyroxynaphtalenes in a reversed-phase chromatographic system", Journal of Chromatography, 1983, vol. 281, pp. 35-47; Table 1, p. 38. (Year: 1983).*
Varga et al., "Mechanism of allergic cross-reactions. I. Multispecific binding of ligands to a mouse monoclonal anti-DNP IgE antibody" Molecular Immunology (1991), 28(6), 641-54 (Year: 1991).*

(Continued)

*Primary Examiner* — Dennis White
(74) *Attorney, Agent, or Firm* — The Belles Group, P.C.

(57) ABSTRACT

A method of detecting the presence of fentanyl or a fentanyl analogue in a sample which comprises contacting the sample with a 1,2 naphthoquinone (such as 1,2-naphthoquinone itself) in a solvent, preferably acetonitrile, and observing a colour change, which when present, correlates with the presence of fentanyl or a fentanyl analogue. Optionally, a buffer may be provided to maintain an alkaline environment and/or a metal halide catalyst and/or light source may be added to accelerate colour development.

20 Claims, 5 Drawing Sheets

(56) References Cited

PUBLICATIONS

Roda, G., et al., "Ten Years of Fentanyl-like Drugs: a Technical-analytical Review," Analytical Sciences May 2019, vol. 35, (2019) The Japan Society for Analytical Chemistry, pp. 479-491 (13 pp).

Zhou, Q. et al., "Photochemical Reaction Between 1,2-Naphthoquinone and Adenine in Binary Water-Acetonitrile Solutions," Photochemistry and Photobiology, (2018), 94: pp. 61-68 (8 pp).

European Patent Office, European Supplementary Search Report issued in EP Application No. 21770537.5, mailed Mar. 18, 2024, pp. 1-10.

Vespalec, R., et al., "Behaviour of dihyroxynaphtalenes in a reversed-phase chromatographic system", Journal of Chromatography, 1983, vol. 281, pp. 35-47; Table 1, p. 38.

Argente-Garcia, A., et al., "A solid colorimetric sensor for the analysis of amphetamine-like street samples", Analytica Chimica Acta, 2016, vol. 943, pp. 123-130.

Philp, M., et al., "Development and validation of a presumptive colour spot test method for the detection of piperazine analogues in seized illicit materials", Analytical Methods Oct. 21, 2013, vol. 5, pp. 5402-5410.

Da Silva, G., et al., "Portable and low-cost colorimetric office paper-based device for phenacetin detection in seized cocaine samples", Talanta, 2018, vol. 176, pp. 674-678.

Philp, M., et al. "A review of chemical 'spot' tests: A presumptive illicit drug identification technique", Drug Testing and Analysis 2018., vol. 10, No. 1, pp. 95-108.

\* cited by examiner

Monitoring the absorbance at 584 nm for the reaction of fentanyl with 1,2-NQ

IN-FIELD COLOUR TEST FOR SCREENING FENTANYL AND ANALOGUES THEREOF

CROSS-REFERENCE TO RELATED PATENT APPLICATIONS

The present application is a U.S. national stage application under 35 U.S.C. § 371 of PCT Application No. PCT/AU2021/050256, filed Mar. 19, 2021, which claims priority to Australian Patent Application No. 2020900865, filed Mar. 20, 2020. The disclosures of the aforementioned priority applications are incorporated herein by reference in their entireties.

FIELD OF THE INVENTION

The invention relates to tests for the determination of illicit substances. In particular, the invention relates to tests for the detection of drugs of the fentanyl family. The invention also relates to kits and devices for the detection of fentanyl and fentanyl analogues.

BACKGROUND

The present-day illicit drug trade is a large, lucrative, global industry. Technological advances and the ingenuity of rogue chemists continues to present ongoing challenges for law enforcement authorities and for scientists and engineers developing the technology to support them.

One problem faced by law enforcement agencies around the world is the large number of drug seizures that are occurring annually. For instance, figures from the Australian Criminal Intelligence Commission that show 112,827 illicit drug seizures were made between 2017-2018. The presence of new psychoactive substances on the market creates issues with typical screening processes because they often go undetected or are incorrectly identified at these stages. Law enforcement are constantly required to keep up to date with their presumptive testing procedures.

In recent years, the recreational drug market has seen an increase in the abuse of Drug Analogues and New Psychoactive Substances, known collectively as DANPS. DANPS are substances that are structurally or functionally similar to a prohibited or scheduled parent compound. DANPS are often derivatives or analogues of existing illicit drugs, pharmaceutical compounds, substances being researched or naturally occurring compounds. Studies in recent years have provided an understanding for the motivations to use DANPS. These include potentially ambiguous legal status (motivated by a desire to avoid detection), market availability and cost. DANPS may also function as market substitutes for established illicit drugs during times when these are of limited availability or poor quality.

DANPS are of great concern due to the number and diversity of compounds involved and a lack of knowledge about their mode of action, side effects and toxicity, although it is clearly established that many DANPS have been linked to adverse health outcomes.

The prevalence of synthetic and semi-synthetic opioids, which are one category of DANPS, is increasing. This is reflected in the fact that global quantities of pharmaceutical opioids seizures have now reached roughly the same amount as the quantities of heroin. According to the *World Drug Report* 2018—*Analysis of Drugs Markets: Opiates, cocaine, cannabis, synthetic drugs* (Vol. 3). Vienna, Austria, published by the United Nations Office on Drugs and Crime, one particular class of synthetic opioids alone, namely the fentanyls, witnessed a fourfold increase in 2016. The World Drug Report 2019 stated that synthetic opioids (mostly fentanyls) accounted for 29% of newly identified NPS in 2017

Fentanyl and non-pharmaceutical fentanyl analogues have been responsible for numerous outbreaks of overdoses. According to the Centre for Disease Control (CDC) in the US, there were approximately 5000 fentanyl-related deaths in 2014 alone. The World Drug Report stated that there were 19000 deaths from fentanyls and tramadol in 2016 and 28000 in 2017. The exponential increase in non-pharmaceutical fentanyl deaths in recent years makes it clear that this is a widespread problem.

Fentanyl was first synthesised in 1960. Throughout the 1960s and 1970s it was introduced as an intravenous anaesthetic in Europe and the US. Fentanyl is 50 to 100 times more potent than morphine with a faster onset and shorter duration of action. Other delivery systems were explored starting from the 1980s, which lead to the commercialisation of fentanyl patches and various oral preparations of fentanyl mainly aimed to the treatment of chronic pain. The effects induced by fentanyl are similar to those of morphine or heroin. These include sedation, nausea, respiratory depression, slow heart rate and, in high doses, unconsciousness or anaesthesia.

The effects and the high potency explain the high risks of overdose associated with the misuse and abuse of fentanyl and its analogues.

The general chemical structure of fentanyl analogues is shown below. When $R_1=C_6H_5$ and $R_2=R_3=R_4=H$, the compound is fentanyl. $R_1$, $R_2$, $R_3$ and $R_4$ can be modified independently to provide an almost unlimited number of fentanyl-type substances with similar pharmacological effects but variation in potency and duration of action.

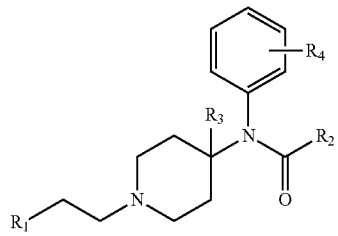

The term "fentanyl analogue" or "fentanyl derivative" as used herein encompasses the above structure, which has the common skeleton specified and where $R_1$, $R_2$, $R_3$ and $R_4$ can be any substituent.

Compared to opium, needed for the production of heroin, the starting materials necessary to synthesise fentanyl analogues are neither expensive nor hard to obtain, and no specific skillset is needed. This explains why most of the fentanyl seized in the last years in the United States has non-pharmaceutical origins. Just a few changes to the synthetic procedure will lead to obtaining different analogues (UNODC (2017). *Fentanyl and its analogues: 50 years on* (Vol. 12). Vienna, Austria: United Nations Office on Drugs and Crime).

Since fentanyl and many of its derivatives are inexpensive and easily synthesised, they are used to lace heroin and cocaine, and they have been found as the principal component in counterfeit pills of Xanax, Norco and oxycodone, causing a large number of overdoses (Armenian, P., Vo, K. T., Barr-Walker, J., & Lynch, K. L. (2018). Fentanyl, fentanyl analogues and novel synthetic opioids: A comprehensive review. *Neuropharmacology*, 134, 121-132)

The exponential increase in non-pharmaceutical fentanyl deaths makes it clear that this is a widespread public-health concern in the United States and in the rest of the world and that new rapid screening methods are necessary (Suzuki, J., & El-Haddad, S. (2017). A review: Fentanyl and non-pharmaceutical fentanyls. *Drug and Alcohol Dependence*, 171, 107-116).

In order to prosecute offenders, it is necessary to be able to identify the drugs involved. Fentanyl is usually identified by either gas chromatography coupled with mass spectrometry (GC/MS) or liquid chromatography coupled with tandem mass spectrometry (LC-MS/MS). However, these techniques present multiple disadvantages: they are time-consuming and need either pre-existing mass spectra references or pre-established methods to target specific compounds. Those are major limitations especially when dealing with new designer fentanyls. LC-HRMS (high resolution mass spectrometry) techniques such as quadrupole time-of-flight or orbitrap mass spectrometry allow data acquisition in an untargeted manner and have proven to be the most useful methods for the detection of novel synthetic opioids. Unfortunately, this technology is not readily available in most laboratories (Armenian, P., Vo, K. T., Barr-Walker, J., & Lynch, K. L. (2018). Fentanyl, fentanyl analogues and novel synthetic opioids: A comprehensive review. *Neuropharmacology*, 134, 121-132).

Other analytical methods, such as NMR are highly reliable for the structural determination of fentanyl or fentanyl analogues, although these are not ideal for high throughput sample analysis owing to their high cost of running, the need for trained personnel and lengthy analysis times.

The large number of illicit drug seizures means that simple, rapid, inexpensive, and accurate field tests are highly desirable for screening purposes.

Presumptive screening tests are designed to provide an indication of the presence or absence of certain drug classes in a test sample. They need to be simple to carry out, robust enough to be used under sub-optimal conditions and sufficiently reliable so they can form the basis for the legal detention of suspects until definitive tests can be completed.

Colour 'spot' tests are a particularly useful type of field test that result in a colour change when applied to a sample containing a drug of interest. The chemical reaction occurring between the colour reagent and the drug of interest provides a very rapid first line screening tool which can, in some cases, be quite selective.

There is currently no commercially available presumptive colour test for fentanyl or fentanyl analogues.

Thus, there is a clear need for a new specific colour test for the presumptive testing of fentanyl or fentanyl analogues.

It is an object of the present invention to overcome or ameliorate at least one of the disadvantages of the prior art, or to provide a useful alternative.

Any discussion of the prior art throughout the specification should in no way be considered as an admission that such prior art is widely known or forms part of common general knowledge in the field.

SUMMARY

According to a first aspect the invention provides a method of detecting the presence of fentanyl or a fentanyl analogue in a sample, the method comprising the step of contacting the sample with a reagent comprising a 1,2 naphthoquinone in a solvent and observing a colour change, which when present, correlates with the presence of fentanyl or a fentanyl analogue.

Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

Preferably, the 1,2-naphthoquinone is unsubstituted 1,2-naphthoquinone.

The solvent is preferably a nitrile, most preferably acetonitrile.

The method preferably further comprises the step of adding a buffer to maintain an alkaline environment. The buffer may be added at any stage but is preferably added to the sample prior to contacting the sample with the reagent comprising a 1,2 naphthoquinone. The buffer should be sufficiently basic to liberate freebase fentanyl or a freebase fentanyl analogue from any fentanyl salt or fentanyl analogue salt present in the sample. A suitable buffer pH is pH 8. The buffer may be a phosphate buffer, such as potassium or sodium phosphate.

The reagent preferably further includes a catalyst. The catalyst may be a metal halide, for example iron chloride or more preferably copper chloride.

The method preferably further comprises the step of exposing the reagent to a light source after the sample has been added. Preferably, the light source has enhanced or preferential emission at about 365 nm.

In one embodiment, the colour change manifests as green. The colour change to green is observed at environmental temperature and ambient lighting within 5 minutes of adding the sample to the reagent, or more preferably the colour change to green is observed at environmental temperature and with a light source (for instance a light source enhanced at 365 nm) within 2 minutes of adding the sample to the reagent.

In one embodiment, the colour change manifests as blue. The colour change to blue is observed at environmental temperature and ambient lighting within 2 hours of adding the sample to the reagent, or more preferably the colour change to blue is observed at environmental temperature and with a light source (for instance a light source enhanced at 365 nm) within 10 minutes of adding the sample to the reagent.

The colour change to green may be temporary and may subsequently over time develop to blue. A green colour may indicate the presence of a small amount of blue in combination with yellow reagents.

Preferably, the fentanyl or fentanyl analogue being detected is a fentanyl analogue unsubstituted on the piperidine ring or a fentanyl analogue without a free OH group, such as β-hydroxyfentanyl.

In another aspect, and without wishing to be bound by theory, the invention provides a reaction product of fentanyl and 1,2-naphthoquinine having the following structure:

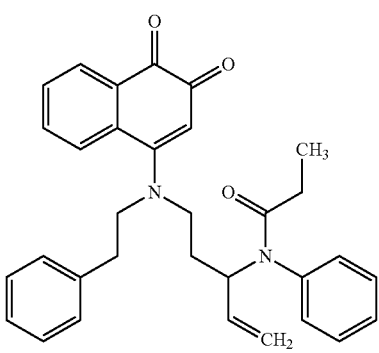 [SMILES: C=CC(CCN(CCc1ccccc1)C1=CC(=O)C(=O)c2ccccc21)N(C(=O)CC)c1ccccc1]

In one embodiment, the method is carried out on a vial or tube. Alternatively, it may be carried out on plate or well to allow visualisation of developed colour, where present. Alternatively, the method takes place in a vessel having a reduced or tapering cross section at a lower portion of the vessel.

Preferably, the sample is an unknown drug sample.

The method of the present invention is preferably used as a presumptive test for a suspected illicit substance. It may be used in the case of a suspected overdose, or for workplace testing.

In another aspect the invention provides a test reagent for detecting the presence of fentanyl or a fentanyl analogue in a sample, the reagent comprising 1,2-naphthoquinone and a solvent. Preferably, the solvent is acetonitrile.

The reagent may also contain a buffer, preferably a phosphate buffer and or a catalyst, such a metal halide like copper or iron chloride.

DESCRIPTION

Figure 1:
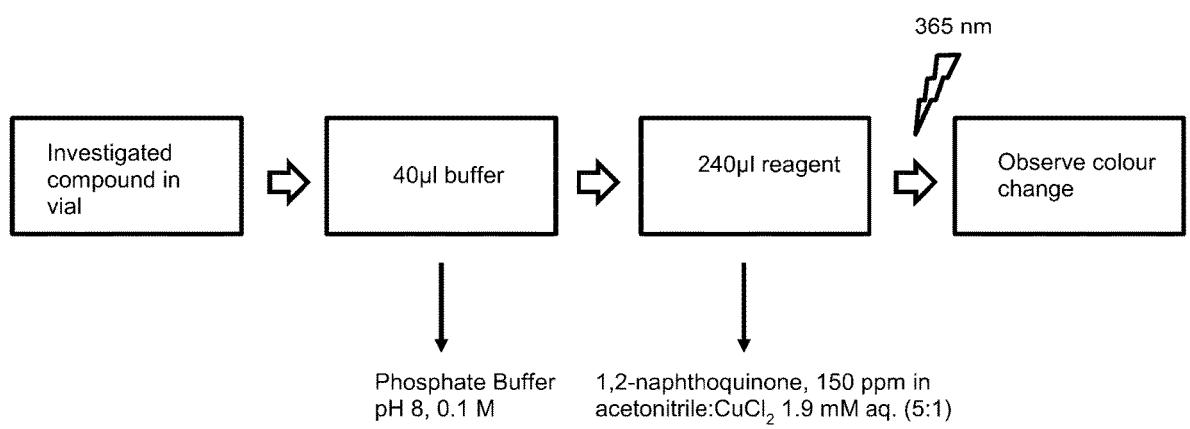
FIG. 1 shows the optimal test method of the present invention

There is currently no presumptive colour test that will correctly and rapidly identify fentanyl and fentanyl analogues compounds selectively from other illicit compounds.

The structure common to fentanyl and all fentanyl analogues contains two major functional groups that can be targeted as a possible site for the formation of coloured adducts: a piperidine ring (tertiary amine) and a tertiary amide.

Amines are known to react with quinones. A number of quinones were therefore screened as possible agents for presumptive testing. In each screening test, the fentanyl sample (150 µg) was treated with the quinone solution (400 µl of a 25 or 50 ppm solution) in n-propanol and toluene as solvents and observing any colour change. The quinones tested are shown in Table 1:

TABLE 1

Quinones investigated and their structures

Benzoquinones

| | |
|---|---|
| 2,3,5,6-tetrafluoro-1,4-benzoquinone | |
| 2,6-dichloro-1,4-benzoquinone | |
| 2,3,5,6-tetrabromo-1,4-benzoquinone | |
| 2,3,5-trichlorobenzo-1,4-quinone | |
| 2,5-dibromo-1,4-benzoquinone | |
| 2,3-dichloro-5,6-dicyano-1,4-benzoquinone | |
| 2,5-dichloro-3,6-dihydroxy-1,4-benzoquinone (chloranilic acid) | |
| 3,4,5,6-tetrachloro-1,2-benzoquinone | |

TABLE 1-continued

| Naphthoquinones | |
|---|---|
| 2,5-dichloro-1,4-benzoquinone | 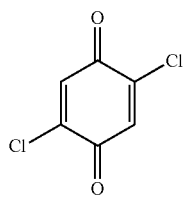 |
| Naphthoquinone | 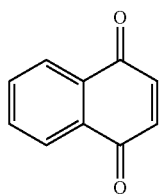 [SMILES: O=C1C=CC(=O)c2ccccc21] |
| 2,3-dichloro-1,4-naphthoquinone | 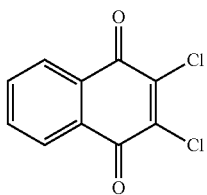 [SMILES: O=C1C(Cl)=C(Cl)C(=O)c2ccccc21] |
| 1,2-naphthoquinone | 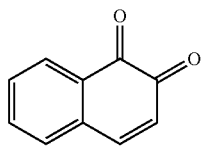 [SMILES: O=C1C=Cc2ccccc2C1=O] |
| 2,3-dichloro-5,8-dihydroxy-1,4-naphthoquinone | 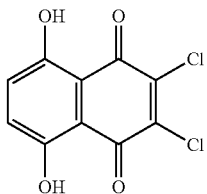 [SMILES: O=C1C(Cl)=C(Cl)C(=O)c2c(O)ccc(O)c21] |
| 1,4-dihydroxynaphtalene | 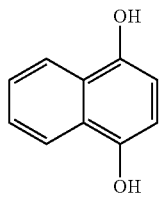 [SMILES: Oc1ccc(O)c2ccccc12] |
| 5,8-dihydroxy-1,4-naphthoquinone | 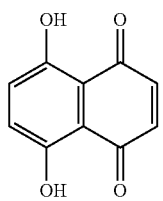 [SMILES: O=C1C=CC(=O)c2c(O)ccc(O)c21] |
| 2-hydroxy-1,4-naphthoquinone (lawsone) | 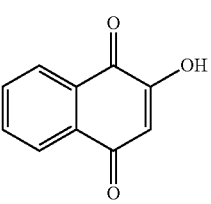 [SMILES: O=C1C=C(O)C(=O)c2ccccc21] |

TABLE 1-continued

| Anthraquinones | |
|---|---|
| 9,10-anthraquinone | 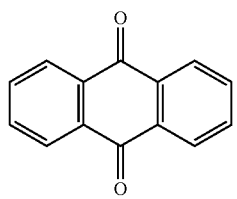 [SMILES: O=C1c2ccccc2C(=O)c2ccccc21] |
| 2-methoxy-10-chloro-9-hydroxyanthracene-1,4-dione | 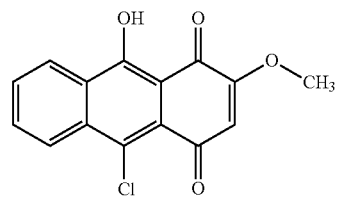 [SMILES: COC1=CC(=O)c2c(c(O)c3ccccc3c2Cl)C1=O] |
| 1,4-anthraquinone | 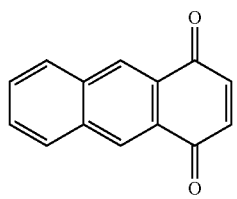 [SMILES: O=C1C=CC(=O)c2cc3ccccc3cc21] |
| 2-methoxy-10-chloro-9-hydroxyanthracene-1,4-dione | 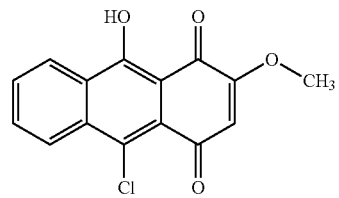 [SMILES: COC1=CC(=O)c2c(c(O)c3ccccc3c2Cl)C1=O] |
| 1,4-dihydroxyanthraquinone (quinizarin) | 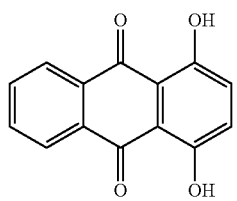 [SMILES: O=C1c2ccccc2C(=O)c2c(O)ccc(O)c21] |
| 9-hydroxy-10-chloroanthracene-1,4-dione | 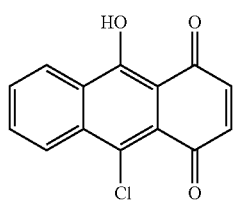 [SMILES: O=C1C=CC(=O)c2c1c(O)c1ccccc1c2Cl] |
| 2,9-dichloro-10-hydroxyanthracene-1,4-dione | 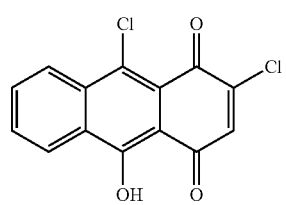 [SMILES: O=C1C=C(Cl)C(=O)c2c1c(O)c1ccccc1c2Cl] |

Of the quinones tested, only four, namely 2,6-dichloro-1,4-benzoquinone, 2,5-dichloro-3,6-dihydroxy-1,4-benzoquinone (chloranilic acid), 2-hydroxy-1,4-naphthoquinone (lawsone) and 1,2-naphthoquinone (1,2-naphthoquinone) gave colour changes when tested on fentanyl. The remaining quinones showed no visible reaction of any interest.

The mere ability to form a coloured adduct is of course simply the first hurdle in providing a presumptive colour test. In order for a presumptive test to be useful, it must also have, among other things, a relatively low incidence of false positives against other substances, particularly those likely to be found in illicit drugs, for example, cutting agents and the like. Thus, the quinones which showed some evidence of a colour change with fentanyl were further tested against common contaminants such as lidocaine, quinine, 6-monoacetylmorphine base (6-MAM), paracetamol and caffeine in order to assess the quinone's specificity.

Lawsone, chloranilic acid and 2,6-dichloro-1,4-benzoquinone resulted in the same colour change observed with fentanyl when tested on lidocaine, quinine and 6-MAM (see Table 2), demonstrating that they were not fentanyl specific.

1,2-naphthoquinone showed a colour change with fentanyl in both toluene and n-propanol. When tested in toluene it gave a pale orange colour and when in n-propanol it developed a pale blue colour overnight.

Toluene was not considered to be ideal given that the colour change from yellow to orange was not specific to fentanyl.

1,2-naphthoquinone solutions in n-propanol were prepared and tested at concentrations of 50, 100, 150, 200, 300, 600 ppm in order to determine the optimal concentration for the reaction with fentanyl. A concentration of 50 ppm required 2 hours to provide a positive result, whereas a 600 ppm concentration gave a positive result after 45 minutes.

However, a 600 ppm 1,2-naphthoquinone solution led to an orange coloured blank. The blue reaction product was thus masked at high excesses of quinone and a dark green positive result with fentanyl resulted, which became dark when develop for additional time. 300 ppm gave a result after 30 minutes while 200 ppm and 150 ppm gave results around 20 minutes. The 150 ppm concentration was considered the best compromise between time and colour, given the yellow colour of the blank and the green colour of the positive result, which turns blue after approximately 2 hours.

TABLE 2 reactions of quinones with fentanyl and others

| Quinone | Blank | Fentanyl | 6-MAM | Quinine | Lidocaine |
| --- | --- | --- | --- | --- | --- |
| 2,6-dichloro-1,4-benzoquinone (in n-propanol) | p. yellow | purple | purple | purple | purple |
| chloranilic acid (in n-propanol) | pink | purple | purple | purple | purple |
| 2-hydroxy-1,4-naphthoquinone (in n-prOH and toluene) | yellow | red-orange | red-orange | red-orange | red-orange |
| 1,2-naphthoquinone (in toluene) | yellow | p. orange | NC | NC | p. orange |
| 1,2-naphthoquinone (in n-propanol) | p. yellow | blue (overnight) | NC | NC | NC |

NC: no colour change,
p.: pale

The present inventors have shown that the nature of the substituents and the symmetry of the quinone are important factors driving the ability of such quinones to form coloured reaction products with fentanyl and its analogues with sufficient specificity and clarity to be useful as a presumptive test. Importantly, it seems that it is not possible to predict with any certainty which quinones, if any, would be useful in such a test. Surprisingly, the present inventors found that of all the quinones tested, only one, 1,2-naphthoquinone, showed promise as a presumptive test for fentanyl.

The structure of the blue reaction product was further investigated and is later detailed below.

A very important requirement for a presumptive test is reliability. It is important that the test does not have too many false negatives (in this case, testing negative for a significant number of fentanyl derivatives), or too many false positives (leading to the detention of too many suspects that will ultimately not lead to convictions).

Any solvent used is required to have good solvency for the quinone and the fentanyl or fentanyl analogue, be inert to the other agents present and ideally non-hazardous for human health. The solvent selection criteria were determined by considering both the shortest reaction time and the best contrast between the blank and the fentanyl colours.

As well as the toluene and n-propanol used as screening solvents, acetonitrile, dichloromethane, ethyl acetate, isopropanol and water were also tested to understand which one would provide the best environment for the reaction with fentanyl as well as the longest stability for 1,2-naphthoquinone. Solvents with high innate toxicity were not considered for that reason.

A lower concentration at 100 ppm was tested but it gave a result that was considered to be too pale, making it harder to distinguish a colour change.

1,2-naphthoquinone in n-propanol (and also isopropanol) was found not to be suitably stable as a pre-prepared reagent. After 2-3 days storage, the reagent darkened and the reaction with fentanyl became slower, to the point where 1,2-naphthoquinone in n-propanol was not useable as a reagent after a few days.

For this reason, dichloromethane, ethyl acetate, water and acetonitrile were also tested. Of the solvents tested, only acetonitrile gave the desired colour change from clear/yellow to green/blue in a reasonable time frame. Acetonitrile was thus selected as the solvent of choice because it provided a sufficiently stable environment for 1,2-naphthoquinone while still enabling a sufficiently rapid reaction with fentanyl.

Various concentrations of acetonitrile were tested and again, as with n-propanol, 150 ppm was found to the preferred reagent concentration. The preferred final reagent was therefore a solution of 150 ppm of 1,2-naphthoquinone in acetonitrile.

Because the coloured adduct is believed to be very highly coloured, it will be detectable at small concentrations. The lower limits of the sample sizes typically expected for fentanyl and fentanyl analogues are of the order of a few tens of micrograms.

It is not unusual for fentanyl or fentanyl analogues to be present in salt form, given the presence of the amine group, so to ensure these are sufficiently soluble and reactive, a buffer can greatly facilitate the test procedure.

A variety of different buffers (0.1 M solutions) were tested:
sodium phosphate buffer pH 8,
potassium phosphate buffer pH 8,
glycine-NaOH buffer pH 9.0,
carbonate-bicarbonate buffer pH 9.2,
borax-NaOH buffer pH 9.3,
carbonate-bicarbonate buffer pH 10,
$Na_2HPO_4$—NaOH buffer pH 10.9 and
$NaHCO_3$—NaOH buffer pH 11.

A few weak bases were also tested for the same purpose as 5% aqueous solutions (w/v):
L-alanine (pH 8),
ammonium hydroxide ($NH_4OH$, pH 10),
sodium carbonate ($Na_2CO_3$, pH 12).

A blank test was performed with buffer solution and 1,2-naphthoquinone reagent to determine whether the buffer reacted with 1,2-naphthoquinone. L-alanine was excluded due to the formation of a pasty yellow salt on contact with 1,2-naphthoquinone.

The buffers were tested against fentanyl. 150 µl of buffer or weak base solution was added to a vial containing 150 µg of analyte and the mixture was well shaken before adding the reagent (and catalyst as described below). The carbonate buffer pH 9.2 and 10, the glycine-NaOH buffer pH 9.0, the borax-NaOH buffer pH 9.3, the $Na_2HPO_4$—NaOH buffer pH 10.9 and the $NaHCO_3$—NaOH buffer pH 11, and the weak bases ammonium hydroxide and sodium carbonate all failed to yield positive results with fentanyl and were thus excluded.

It was found that sodium phosphate pH 8 and potassium phosphate pH 8 buffers did not disturb the reaction between fentanyl freebase and its analogues with 1,2-naphthoquinone. The reaction of 1,2-naphthoquinone with fentanyl analogue salts in the presence of these bases provided very similar results to those observed with fentanyl. Sodium phosphate was chosen arbitrarily to be used for the further development and validation of the test, but a potassium phosphate buffer works equally well.

Ideally, presumptive or in-field tests provide not only a sensitive and specific test, but also a test which is relatively rapid in providing a colour change. A number of approaches were therefore tested with a view to reducing the time required to develop a visually detectable colour.

The effect of temperature on the reaction was tested. Conducing the reaction at temperatures of 40° C., 80° C. or 100° C. was not observed to produce any change in the speed of reaction.

Copper (II) chloride ($CuCl_2$, aqueous) was tested as a possible catalyst for the reaction at concentrations of 0.19 mM, 1 mM, 1.9 mM, 3 mM, 4 mM, 5 mM and 10 mM.

A number of potential catalysts for the reaction were investigated, including copper (II) sulphate ($CuSO_4$), copper (II) acetate ($Cu(CH_3COO)_2$), iron (II) chloride ($FeCl_2$) and cerium (III) chloride ($CeCl_3$) catalysts as aqueous 2 mM solutions. When performing a test, 40 µl of a 2 mM catalyst solution was added to the vial containing the analyte and the reagent.

The investigation into a possible catalyst started with copper (II) chloride. The $CuCl_2$ solutions were first tested with a reagent comprising 1,2-naphthoquinone 200 ppm in n-propanol, which, without $CuCl_2$, was taking 20 minutes to give a result. As a first screening 0.19 mM, 1.9 mM solutions were tested giving results after 20 minutes and after 10 minutes, respectively. A 10mM solution gave no colour change. This suggests that the ratio between fentanyl and $CuCl_2$ is significant, and if there is a large excess of $CuCl_2$ the reaction will not take place. Concentrations of 1.0 mM, 1.9 mM, 3.0 mM, 4.0 mM and 5.0 mM were tested using the chosen 1,2-naphthoquinone 150 ppm in acetonitrile and the 1.9 mM solution appeared to develop a colour change faster than the other concentrations.

The other catalysts were tested and yielded comparable results, $FeCl_2$ was seen to provide a faster reaction (about 7 minutes) without buffer, but when a buffer was used, the speed of reaction was similar to that observed with $CuCl_2$. A $CuCl_2$ solution (1.9 mM) was finally chosen as the best way to increase the speed of reaction, bringing it from 20 minutes down to 10 minutes.

Further, it was surprisingly discovered that the reaction between 1,2-naphthoquinone and the fentanyl or fentanyl analogue does not occur if the mixture is kept in the dark, e.g. if placed in a box in a cupboard immediately after addition of the reagent to the sample.

The reaction was further investigated to determine whether a specific light source could be used to accelerate the development of a detectable colour. In these tests, a mixture of fentanyl and 1,2-naphthoquinone was exposed to a light source and checked for a colour change each minute for 20 minutes. Three different light sources were tested:
Polilight® PL500 ROFIN (500 W) used on the white light setting, which ranges from 400 to 680 nm, and on UV setting 350 nm,
UV handheld lamp used for the reading of thin layer chromatography plaques, model Spectroline® ENF-260C7FE (6 W) which has two settings, 365 and 254 nm and
UV torch from Sirchie® (1 W), which has a wavelength of 365 nm.

The UV TLC lamp was found to be the most effective way to speed up the reaction with light. In fact, even though the polilight® (UV setting) and the UV torch also gave results, the UV TLC lamp was the only one to accelerate the results without changing the colours observed so far for this test. When using this lamp, after two minutes a green colour could be observed, compared to ten minutes without a light source. After 10 minutes the colour became blue, compared to two hours without this final step. The results of using a light source as the last step of the test are summarised in Table 3.

TABLE 3

Use of different light sources

| Light Source | Blank | Fentanyl |
| --- | --- | --- |
| Polilight ®, white light | pink-orange | orange-brown |
| Polilight ®, UV 350 nm | pink-orange | green-grey |
| UV TLC lamp, 360 nm | yellow (NC) | green (2-3 min) |
| UV TLC lamp, 254 nm | yellow (NC) | NC |
| UV torch, 365 nm | pink-orange | grey |

NC: no change compared to when no light source is used

In order to further enhance the usefulness of the present method, the optimal volumes were also investigated. A small amount of fentanyl or fentanyl analogue and a large volume of reagent, when there is significantly more 1,2-naphthoquinone than fentanyl, will result in the blue colour being more dilute and also masked by the colour of 1,2-naphthoquinone than with a smaller quantity of reagent.

For this reason, the volumes of buffer, 1,2-naphthoquinone solution and catalyst were optimised to have the smallest volume, which theoretically would also give a lower limit of detection.

The following buffer volumes were tested: 150, 100, 50, 40, 30, 20 µl. After the optimal buffer volume was chosen, 400, 300 and 200 μl of 1,2-naphthoquinone solution and 40, 30 and 20 μl of catalyst solution were tested in all their possible combinations.

Ideally, an in-field colour test would require the use of a single reagent only. Minimising the number of reagents was therefore attempted by testing a pre-combined buffer, 1,2-naphthoquinone and catalyst solution as well as a 1,2-naphthoquinone and catalyst solution. The optimal volumes chosen for the different reagents of the test were 40 μl of phosphate buffer (0.1 M, pH 8), 200 μl of 1,2-naphthoquinone (150 ppm in acetonitrile) and 40 μl of $CuCl_2$ (1.9 mM (aq.)).

The naphthoquinone solution and the catalyst can be mixed together without a change in speed of reaction or in the colour change. However, when the buffer was premixed with the other two reagents, it took 30 minutes to observe a positive result. This is not ideal and it is better to add the buffer to the fentanyl or fentanyl analogue as a separate first step, followed by a second step of adding a reagent comprising a mixture of 1,2-naphthoquinone and catalyst in acetonitrile.

Summary of Optimal Method

The following general procedure is thus recommended (see FIG. 1):

To a small amount of sample in a vial or test tube add:
1) 40 μl of phosphate buffer pH 8, 0.1 M (or 1 drop)
2) 240 μl of reagent 1,2-naphthoquinone 150 ppm in acetonitrile: catalyst $CuCl_2$ 1.9 mM aq. (5:1) (or 4-5 drops)
3) If possible, expose the mixture to the 365 nm light of a UV lamp used for TLC reading
4) Observe colour change for up to 10 minutes if using light, or more if not using light The sample tested can be either solid or liquid.

In addition to being able to reliably identify the class of substances targeted, a presumptive test should minimise the number of false positives, i.e. should not give positive results on other substances. This is particularly the case in drug tests, where target substances are often adulterated with a variety of household chemicals.

Sensitivity of a test is the true positive rate (that is, in this case, the percentage of fentanyls that react positively to the test) and specificity is the true negative result (that is, in this case, the percentage of other substances tested that did not produce a false positive test).

To test the sensitivity of the reagent for the fentanyl class, 21 fentanyl analogues were tested: acetylfentanyl HCl, acrylfentanyl HCl, alfentanil HCl, benzodioxolefentanyl, β-hydroxyfentanyl HCl, butyrylfentanyl HCl, 4-chloroisobutyrylfentanyl HCl, cyclopentylfentanyl HCl cyclopropylfentanyl, 4-fluoroisobutirylfentanyl HCl, furanylfentanyl HCl, phenylpropionylfentanyl, remifentanil, sufentanil citrate, ocfentanil, ortho-fluoro fentanyl, benzyl fentanyl, despropionyl para-fluoro fentanyl, 4-fluorobutyryl fentanyl, N-methyl norcarfentanil and norfentanyl. Their structures can be found in Table 4.

TABLE 4

| Fentanyl and Analogues tested | | | | |
|---|---|---|---|---|
| Compound | Structure | Initial Colour Change | 10 Minute Colour Change | Reaction (Yes/no) |
| Blank | N/A | Yellow | Yellow | |
| Fentanyl | | NC | Green | Yes |
| Acetylfentanyl | | NC | Green | Yes |
| Acrylfentanyl HCl | | NC | Green | Yes |

TABLE 4-continued

Fentanyl and Analogues tested

| Compound | Structure | Initial Colour Change | 10 Minute Colour Change | Reaction (Yes/no) |
|---|---|---|---|---|
| Alfentanil HCl | | NC | NC | No |
| Benzodioxole Fentanyl | | NC | Green | Yes |
| ß-hydroxyfentanyl HCl | | NC | NC | No |
| 4-chloroisobutyrylfentanyl HCl | | NC | Green | Yes |
| Butyrylfentanyl HCl | | NC | Green | Yes |

TABLE 4-continued
| | Fentanyl and Analogues tested | | | |
|---|---|---|---|---|
| Compound | Structure | Initial Colour Change | 10 Minute Colour Change | Reaction (Yes/no) |
| Cyclopropylfentanyl | 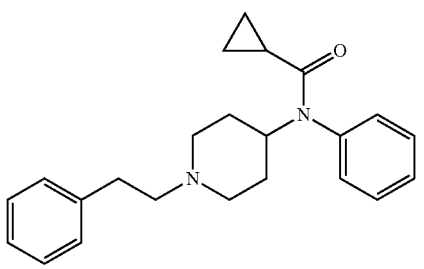 [SMILES: O=C(C1CC1)N(c1ccccc1)C1CCN(CCc2ccccc2)CC1] | NC | Green | Yes |
| Cyclopentylfentanyl HCl | 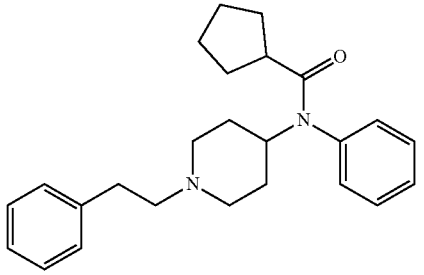 [SMILES: O=C(C1CCCC1)N(c1ccccc1)C1CCN(CCc2ccccc2)CC1] | NC | Green | Yes |
| 4-Fluoroisobutyrylfentanyl HCl | 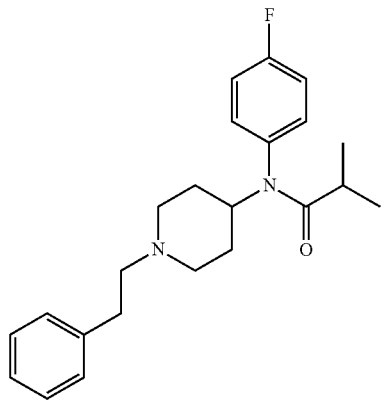 [SMILES: CC(C)C(=O)N(c1ccc(F)cc1)C1CCN(CCc2ccccc2)CC1] | NC | Green | Yes |
| Furanylfentanyl HCl | 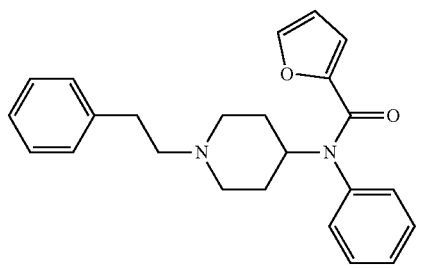 [SMILES: O=C(c1ccco1)N(c1ccccc1)C1CCN(CCc2ccccc2)CC1] | NC | Green | Yes |

TABLE 4-continued

Fentanyl and Analogues tested

| Compound | Structure | Initial Colour Change | 10 Minute Colour Change | Reaction (Yes/no) |
|---|---|---|---|---|
| Phenylpropionylfentanyl (3-phenylpropanoyl fentanyl or ß'-phenylfentanyl) | | NC | Green | Yes |
| Remifentanil HCl | | NC | NC | No |
| Sufentanil Citrate | | NC | Brown (30 min) | Yes (brown, slower reaction) |
| Ocfentanil | | NC | Green | Yes |
| Ortho-fluoro fentanyl | | NC | Green | Yes |
| Benzyl fentanyl | | NC | Green | Yes |

TABLE 4-continued

Fentanyl and Analogues tested

| Compound | Structure | Initial Colour Change | 10 Minute Colour Change | Reaction (Yes/no) |
|---|---|---|---|---|
| Despropionyl para-fluoro fentanyl | 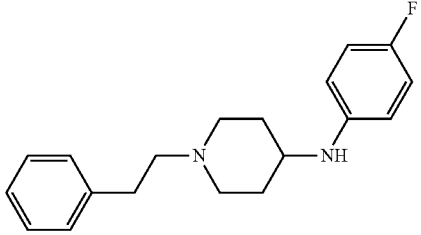 [SMILES: Fc1ccc(NC2CCN(CCc3ccccc3)CC2)cc1] | NC | Pale Green | Yes |
| 4-fluoro butyryl fentanyl | 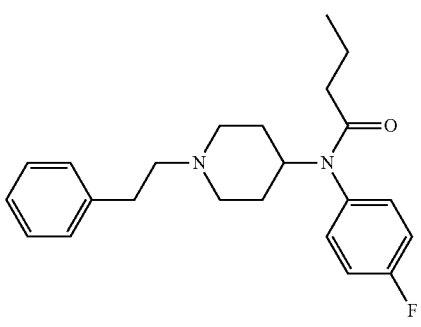 [SMILES: CCCC(=O)N(c1ccc(F)cc1)C1CCN(CCc2ccccc2)CC1] | NC | Pale Green | Yes |
| N-methyl norcarfentanil | 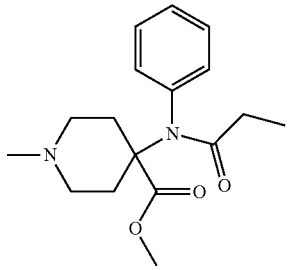 [SMILES: CCC(=O)N(c1ccccc1)C1(C(=O)OC)CCN(C)CC1] | NC | NC | No |
| Norfentanyl | 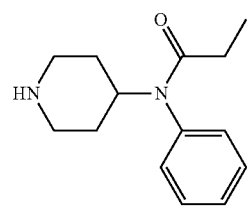 [SMILES: CCC(=O)N(c1ccccc1)C1CCNCC1] | NC | Bright Orange | Yes (different colour) |

The amount of analyte used for testing was 150 μg for all except acetylfentanyl, acrylfentanyl, butyrylfentanyl and 4-chloroisobutyrylfentanyl, where only about 25 μg was used due to limited availability.

Four analogues tested, alfentanil, remifentanil, β-hydroxyfentanyl and N-methyl norcarfentanil did not show a shift in colour.

Alfentanil, remifentanil and sufentanil (which reacted but gave a brown colour and took longer than others) are all therapeutical fentanyls used in medicine as anaesthetics and analgesics. To date, no misuse of Alfentanil, remifentanil and sufentanil has been reported (Patil Armenian, K. T. V. J. B.-W. K. L. L., 2018. Fentanyl, fentanyl analogs and novel synthetic opioids: A comprehensive review. Neuropharmacology, Issue 134, pp. 121-132). Without wishing to be bound by theory, these analogues all have a substituent on the carbon of the piperidine ring connected to the nitrogen of the amide group. If the reaction between 1,2-naphthoquinone and fentanyl is occurring on the tertiary amine, then it is theorised that a substitution on the piperidine ring creates too much of a hindrance for the reaction to occur at all. From the results of N-methyl norcarfentanil, a similar result is expected for the similarly substituted compound carfentanil as well.

In the case of β-hydroxyfentanyl, again without wishing to be bound by theory, it is possible that an intramolecular hydrogen bond between the hydroxyl group and the nitrogen of the piperidine group is formed and makes the nitrogen unavailable for other reactions.

It is possible that the change from a tertiary to secondary amine on the piperidine ring of norfentanyl accounts for the change in coloured product. In this case, a bright orange colour was formed, as opposed to the green present for the other derivatives.

The EMCDDA reports valerylfentanyl, 4-fluoroisobutyrylfentanyl, acryloylfentanyl (acryl fentanyl), cyclopentyl fentanyl and carfentanil as the fentanyl derivatives most seized in Europe in 2017 (EMCDDA, 2018. European Drug Report 2018: trends and development. Luxembourg: Publications Office of the European Union). All except carfentanil have substitutions close to the carbonyl of the amide group, like the other analogues tested that gave positive results.

Therefore, it seems that many current designer fentanyls would be detected by the test.

To test the specificity of the test for the fentanyl class, a total of 102 other substances were tested. Among these were the most common illicit drugs 3,6-diacetylmorphine (heroin HCl), cocaine HCl, dexamphetamine HCl, methylenedioxymethamphetamine HCl (MDMA HCl), 6-monoacetylmorphine (6-MAM), methamphetamine HCl and morphine HCl. The rest were new psychoactive drugs (NPS), steroids, benzodiazepines, medicinal drugs, other powdered substances and common cutting agents including sugars, paracetamol and caffeine. The results are shown in Table 5.

TABLE 5

Results of specificity studies

| Compound Class | Compound | Initial Colour Change | 5 min colour change |
|---|---|---|---|
| Reference | Blank | Yellow | Yellow |
|  | Fentanyl | NC | Green |
| Common Illicit Drugs | Cocaine HCl | NC | NC |
|  | Dexamphetamine HCl | NC | NC |
|  | Diacetylmorphine (Heroin) HCl | NC | NC |
|  | MDMA HCl | NC | NC |
|  | Methamphetamine HCl | NC | NC |
|  | 6-monoacetylmorphine base | NC | NC |
|  | Morphine HCl | NC | NC |
| Phenethylamines | 4-ethyl-2,5-dimethoxyphenethylamine (2C—E) | NC | NC |
|  | 4-iodo-2,5-dimethoxyphenethylamine (2C—I) | NC | NC |
|  | 4-bromo-2,5-dimethoxy-phenethylamine (2C—Br) | NC | NC |
|  | 25-H-NBOMe | NC | NC |
|  | 25-E-NBOMe | NC | NC |
|  | 25-I-NBOMe | NC | NC |
| Synthetic Cathinones | Methcathinone HCl | NC | NC |
|  | Methylone HCl | NC | NC |
|  | Ethylone HCl | NC | NC |
|  | 4-methylmethcathinone HCl | NC | NC |
|  | 4-fluoromethcathinone HCl | NC | NC |
|  | 4-methylpyrrolidinopropiophenone HCl | NC | Bright Green* |
|  | 4-methylpyrrolidinobutiophenone HCl | NC | Bright Green* |
|  | Pyrovalerone HCl | NC | Green* (→bright green after 10 min) |
| Synthetic Cannabinoids | UR-144 | NC | NC |
|  | JWH-073 | NC | NC |
| Synthetic Opioids | U49900 | NC | NC |
|  | AH 7563 | NC | NC |
|  | AH 7959 | NC | NC |
|  | AH 8507 | NC | NC |
|  | AH 8532 | NC | NC |
|  | UF-17 | NC | NC |
| Benzodiazepines | Alprazolam | NC | NC |
|  | Flunitrazepam | NC | NC |
|  | Oxazepam | NC | NC |
|  | Triazolam | NC | NC |
| Steroids | DHEA | NC | NC |
|  | Drostanolone propionate | NC | NC |
|  | Methandienone | NC | NC |
|  | Stanozolol | NC | NC |
| Sugars | Artificial Sweetener | NC | NC |
|  | Brown Sugar | NC | NC |
|  | Cellulose | NC | NC |
|  | d-Fructose | NC | NC |
|  | d-Sorbitol | NC | NC |
|  | Glucose | NC | NC |
|  | Icing Sugar | NC | NC |
|  | Inositol | NC | NC |
|  | Lactose | NC | NC |
|  | Maltose | NC | NC |
|  | Mannitol | NC | NC |
|  | Sucrose | NC | NC |

TABLE 5-continued

Results of specificity studies

| Compound Class | Compound | Initial Colour Change | 5 min colour change |
|---|---|---|---|
| Other Drugs | Allopurinol | NC | NC |
| | Aminophenazone | Orange | Red |
| | Amitriptyline HCl | NC | NC |
| | Aspirin | NC | NC |
| | Benzocaine | NC | Orange |
| | Caffeine | NC | NC |
| | Carbamazepine | NC | NC |
| | Codeine Phosphate | NC | NC |
| | Codral (paracetamol, pseudoephedrine, codeine) | NC | NC |
| | Doxepin HCl | NC | NC |
| | Ephedrine HCl | NC | NC |
| | Fluoxetine HCl (prozac) | NC | Orange |
| | Ibuprofen | NC | NC |
| | Lidocaine | NC | NC |
| | Metronidazole | NC | NC |
| | Panamax tablet, crushed (paracetamol and excipients) | NC | NC |
| | Paracetamol | NC | NC |
| | Phenacetine | NC | NC |
| | Phenobarbital | NC | NC |
| | Propanolol HCl | NC | NC |
| | Quinine | NC | NC |
| | Salycilamide | NC | NC |
| | Spronolactone | NC | NC |
| | Sulindac | NC | NC |
| | Tetramisole | NC | NC |
| | Tramal (tramadol HCl and excipients) | NC | NC |
| | Verapamil HCl | NC | Orange |
| Other substances | Ascorbic acid | NC | Clear/Transparent |
| | Benzoic acid | NC | NC |
| | Boric acid | NC | NC |
| | Calcium chloride | NC | NC |
| | Citric acid | NC | NC |
| | Cornflour | NC | NC |
| | Creatine | NC | NC |
| | Dimethyl sulfonate | NC | NC |
| | Flour | NC | NC |
| | Indole | Orange | Orange |
| | Magnesium stearate | NC | NC |
| | Methylimidazole | Bright Orange | Bright Orange |
| | Methylpropionanilide | NC | NC |
| | Phenolphthalein | NC | NC |
| | Piperidine | Orange | Orange |
| | Potassium carbonate | NC | NC |
| | Pyrazole | NC | NC |
| | Pyridine | NC | NC |
| | Salt | NC | NC |
| | Sodium bicarbonate | NC | NC |
| | Sodium carbonate | NC | NC |
| | Sodium phosphate dibasic | NC | NC |
| | Starch | NC | NC |
| | Stearic acid | NC | NC |
| | Tartaric acid | NC | NC |
| | Thiamine | NC | NC |

None of the illegal substances tested gave a reaction, and neither did the sugars or common cutting agent like paracetamol and caffeine.

Three cathinones produced a colour similar to the one given by fentanyl. It is noted that these three molecules contain a pyrrolidine group which is a cyclic tertiary amine, similar to the piperidine group present in fentanyl and its analogues. Nonetheless, these compounds can be distinguished because the reaction is much faster for these compounds, giving a bright green after 5 minutes for 4-methylpyrrolidinopropriophenone HCl (4-MPPP) and 4-methylpyrrolidinobutiophenone HCl (4-MPBP) and a green for pyrovalerone HCl.

To assess the selectivity of the reagent for fentanyl in the presence of other common contaminants, tests were done on mixtures of fentanyl and heroin HCl, fentanyl and cocaine HCl, fentanyl and methamphetamine HCl, fentanyl and MDMA HCl, fentanyl and paracetamol, fentanyl and caffeine, and fentanyl and maltose, where the amount of fentanyl was either 150 µg, 50 µg or 20 µg and its percentage in the mixtures varied between 66% and 5%. No difference in the positive result for fentanyl in the presence of contaminants was observed apart from paracetamol and MDMA. The results are shown in Table 6

TABLE 6

Purity study results

| Mixed product (μg) | Fentanyl (μg) | Fentanyl Percentage (%) | Result[a] |
|---|---|---|---|
| Heroin | | | |
| 300 | 150 | 66 | green (10 m.) |
| 150 | 150 | 50 | green (10 m.) |
| 75 | 150 | 33 | green (10 m.) |
| 20 | 20 | 50 | green (15 m.) |
| 60 | 20 | 25 | green (15 m.) |
| 180 | 20 | 10 | p. green (15 m.), green (20 m.) |
| 380 | 20 | 5 | p. green (15 m.), green (20 m.) |
| Cocaine | | | |
| 150 | 150 | 50 | green (10 m.) |
| 20 | 20 | 50 | green (15 m.) |
| 380 | 20 | 5 | p. green (15 m.), green (20 m.) |
| MDMA | | | |
| 150 | 150 | 50 | green (10 m.) |
| 450 | 150 | 25 | p. green (20 m.), green (25 m.) |
| 950 | 50 | 5 | NC |
| 20 | 20 | 50 | p. green (20 m.), green (30 m.) |
| 380 | 20 | 5 | NC |
| Methamphetamine | | | |
| 150 | 150 | 50 | green (10 m.) |
| 20 | 20 | 50 | green (20 m.) |
| 380 | 20 | 5 | p. green (15 m.), green (20 m.) |
| Paracetamol | | | |
| 75 | 150 | 66 | p. green (10 m.), green (15 m.) |
| 150 | 150 | 50 | green (20 m.) |
| 300 | 150 | 33 | green (20 m.) |
| 450 | 150 | 25 | p. green (25 m.), green (50 m.) |
| 950 | 50 | 5 | NC |
| 20 | 20 | 50 | p. green (20 m.), green (30 m.) |
| 380 | 20 | 5 | NC |
| Caffeine | | | |
| 150 | 150 | 50 | green (10 m.) |
| 20 | 20 | 50 | green (15 m.) |
| 380 | 20 | 5 | green (20 m.) |
| Maltose | | | |
| 150 | 150 | 50 | green (10 m.) |
| 20 | 20 | 50 | green (15 m.) |
| 380 | 20 | 5 | green (20 m.) |

[a]NC = no colour change, p. = pale, m. = minutes

For fentanyl 50% in paracetamol, approximately 20 minutes was necessary to determine that a positive result was obtained. This is double the time of a test on pure fentanyl. A large amount of paracetamol can slow down or stop the reaction of 1,2-naphthoquinone and fentanyl, as it is seen when fentanyl is 5% or less of a mixture with paracetamol and no green colour is observed.

Regarding MDMA HCl, for a fentanyl mixture of 25% in MDMA, 20 minutes was necessary to see a positive result and no result is observed when fentanyl is 5% or less of the mixture.

Without any attempt at optimizing the volumes of the different reagents, it was found that a positive result was observed with as little as 50 μg of fentanyl. Therefore, to determine the lower limit of detection (LOD), 25, 20, 15, 10 and 5 μg of fentanyl were tested with the standard method with and without light source.

The lower the amount of fentanyl, the paler the green result was, and even if reacting, took a longer time to be declared as a positive result. For 25 μg and below, a positive result took around 15 minutes to be seen. When using the optimized volumes of the reagents, it was possible to lower the LOD to 15 μg. When using a light source, the LOD seems to be higher. There is no result when testing below 40 μg.

A solution of 1,2-naphthoquinone 150 ppm was prepared in acetonitrile to test its stability and was divided in 3 different scintillation vials that were closed with parafilm® and placed on a laboratory shelf, cupboard and refrigerator (5° C.) respectively. Similar samples of a 10:1 solution of 1,2-naphthoquinone 150 ppm and $CuCl_2$ 1.9 mM (aq.) were also prepared in order to understand if the 1,2-naphthoquinone and $CuCl_2$ steps can be merged into one without compromising the stability of the reagent.

The solutions were used on fentanyl at 2 weeks' intervals and compared to the result of a fresh solution and between each other for up to ten weeks.

The results of the stability testing saw no significant change in speed of reaction for all reagents for up to 10 weeks for the 1,2-naphthoquinone solutions and for up to 8 weeks for the 1,2-naphthoquinone and $CuCl_2$ solutions. The latter, after 10 weeks, showed a difference in the colour observed after reaction with fentanyl. In fact, the solution initially turned brown-green instead of the usual green. This change delayed the determination of a positive result by a couple of minutes.

This is mitigated after additional time and in the end all tests developed the blue colour characteristic of the reaction with fentanyl with no differences between them or a fresh reagent. The solutions can still be used to give a positive result after 10 weeks and the effect on the speed of reaction could be mitigated if a light source is used to accelerate it.

The method of the present invention are useful visual tests because of the colour change. However, the test lends itself to being conducted in a more automated or standardised manner if desired.

Figure 2:
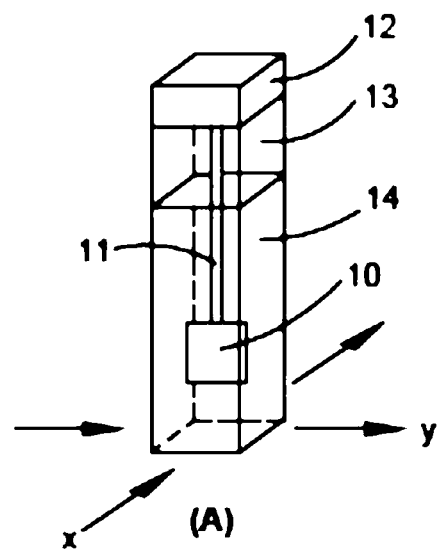
FIG. 2 shows devices suitable for the detection of the colour change.
Figure 2:
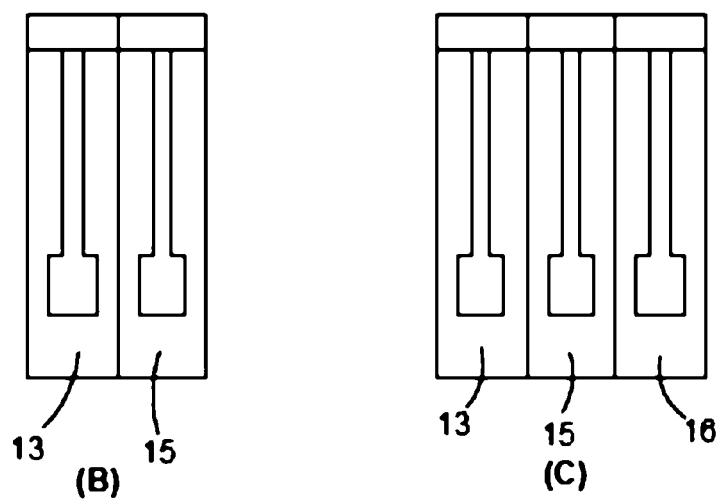

A device suitable for detection of the colour change is shown in FIG. 2A. A collection swab has an absorbent end section 10 which can be used to collect particles of the suspected drug material. The absorbent portion is mounted on an elongate shaft 11 which connects to the inside of a cuvette lid 12. In use, the absorbent end of the swab is inserted into the cuvette 13 and the cuvette lid is sealingly engaged with the cuvette. The cuvette contains the necessary reagents 14 to detect the fentanyl or fentanyl analogue. Upon sealing engagement, the absorbent portion contacts the reagents and the colour change to blue indicative of fentanyl or fentanyl analogue develops. The cuvette as exemplified is of square cross section and has equal optical paths in the x-y plane. This would render the cuvette suitable for both naked eye and instrument detection In FIG. 2B, the cuvette 13 can also have an adjacent reference cuvette 15 integrally formed therewith, which would show the background solution colour and make the colour change more obvious.

In FIG. 2C, the cuvette 13 can also have another chamber 16 attached in proximity thereto which contains no reagents to allow for simultaneous collection and retention of a portion of the sample for further analysis in the event that the validity of the presumptive test is challenged.

Figure 3:
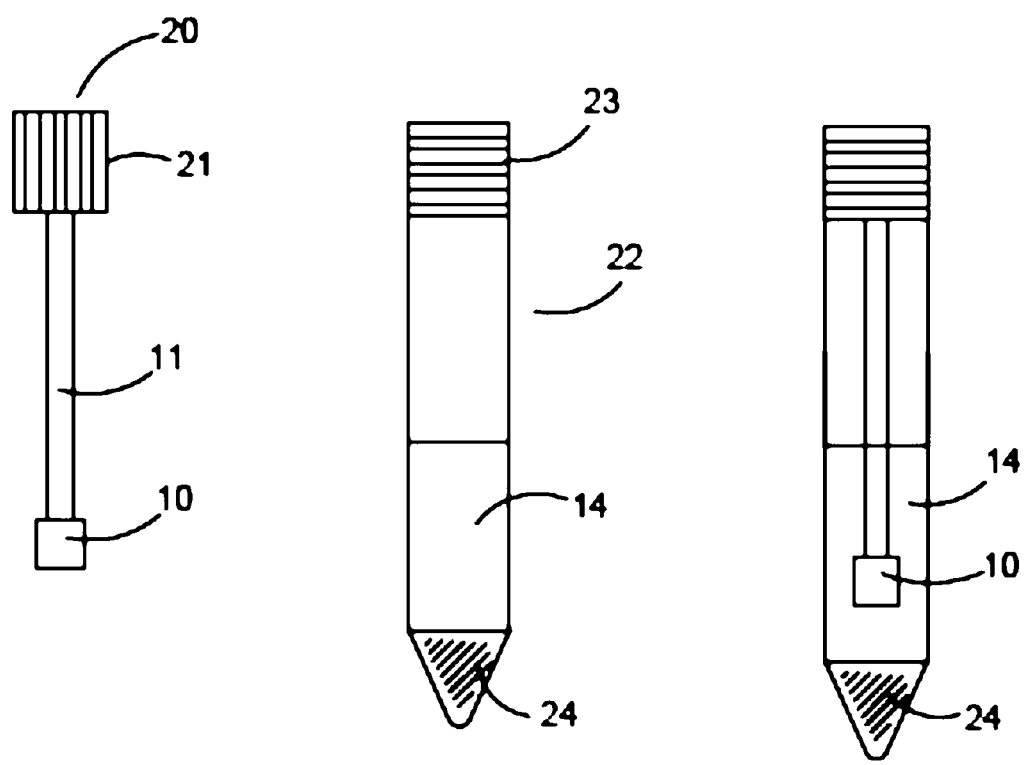
FIG. 3 shows kits or devices suitable for the detection of the colour change.

A particular embodiment of the test kit is shown in FIG. 3. A collection swab 20 has an absorbent end section 10 which can be used to collect particles of the suspected drug material. The absorbent portion 10 is mounted on an elongate shaft 11 which connects to the inside of a tube lid 21. In use, the absorbent end of the swab is inserted into the tube 22 and the tube lid 21 is sealingly engaged with the tube, e.g. by means of interlocking threads 23. The tube 22 contains the necessary reagents 14 and a dense organic layer 24.

Upon sealing engagement, the absorbent portion 10 contacts the aqueous reagents 14 and the complexation begins, thereby developing the necessary colour. An optional heavy organic layer 24 (e.g. chloroform or dichloromethane) may be provided to extract the and intensify the coloured adduct away from impurities. The tube desirably has a reduced cross section at the lower portion to enable better examination of a small amount of solvent.

The lower tip shown in FIG. 3 is conical, although this is not a necessary condition, and, in many cases, it is preferred that the reduced path has a lower portion of reduced cross section with a constant profile. A lower portion of reduced but constant square cross section for example may be more amenable for use in instrumental analysis.

A potential drawback of any test that relies upon inspection by the naked eye is that there can be numerous factors impacting upon what would be considered to constitute a determinative colour change. This can be particularly challenging in the case of field tests for drugs where the lighting conditions and stresses on the analyst would generally be much less favourable than those in the laboratory. Instrumental analysis can help overcome this potential problem. For this reason, it was considered worthwhile to identify the blue adduct formed between fentanyl and 1,2-naphthoquinone.

In order to investigate the nature of the reaction occurring between fentanyl and 1,2-naphthoquinone, and propose a reaction mechanism, the blue colour compound was investigated with several techniques. The blue product was first isolated using solvent extraction by adding ethyl acetate and water, the organic (blue) layer was kept and dried under nitrogen stream, the solid was tested using FTIR, along with comparison samples of 1,2-naphthoquinone and fentanyl.

FTIR indicated that no major changes to the tertiary amine and amide of the fentanyl or ketones of the 1,2-naphthoquinone functional groups occurred. A tertiary amine nitrogen atom is not connected to a hydrogen atom and therefore does not have characteristic peaks in FTIR, unlike secondary and primary amines. Fentanyl contains a tertiary amine and it was possible to see that in the final product, no peaks that would indicate the formation of a secondary or primary amine were seen, neither were peaks indicating the presence of alcohol or aldehyde. It seems therefore that all the functional groups of fentanyl and 1,2-naphthoquinone remain unaltered in the final blue product that is formed by their reaction. For QTOF analysis, the blue isolated product was reconstituted in acetonitrile (1.5 ml total), filtered and directly injected without any previous method of separation; this was done for a reaction that occurred in the presence of $CuCl_2$ and for one that occurred without $CuCl_2$.

QTOF analysis showed the molecular ion of the blue product at 491 m/z ($[M+H]^+$), therefore the mass of the blue compound is 490 Da, which is the sum of fentanyl and 1,2-naphthoquinone masses minus 4 mass units. Without wishing to be bound by theory, this suggests a reaction causing a loss of 4 hydrogen atoms which could occur by the formation of two double bonds. It is thought that the site of reaction is the nitrogen of the piperidine ring of fentanyl. A possible mechanism of reaction is that firstly a quaternary amine is formed in this site, leading to the opening of the piperidine ring and the formation of a double bond. The amine could then react in para position with 1,2-naphthoquinone, forming the blue product. However, this theory cannot explain how another double bond is formed, and two additional hydrogen atoms are lost. The tentative structure for the blue product is shown below.

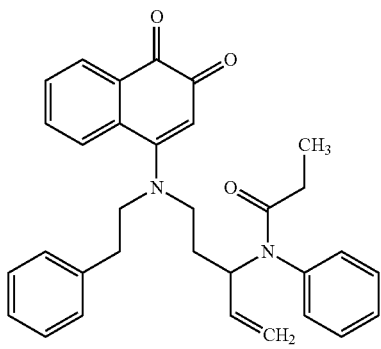

Even though additional investigation may be necessary to fully understand the mechanism of reaction, the QTOF analyses allow the conclusion with certainty that the same product is formed with or without $CuCl_2$ being present, which is indeed acting as a catalyst, speeding up the reaction but not being part of the final product.

A similar reaction was modelled using pyrovalerone as a substitute for fentanyl. The results found for the pyrovalerone was analogous to those for fentanyl. The molecular mass found also differs by 4 units from the sum of 1,2-naphthoquinone and pyrovalerone mass. This synthetic cathinone contains a tertiary amine in the form of a pyrrolidine ring, which is very similar to the piperidine structure of fentanyl. These two factors suggest that the same mechanism of reaction occurs and gives more weight to the theory that the reaction occurs on the tertiary cyclic amine.

A small amount of the blue isolated solid was re-diluted in acetonitrile and tested to obtain its UV-Vis spectrum, 1,2-naphthoquinone in acetonitrile and the solution of 1,2-naphthoquinone and $CuCl_2$ were also tested in UV-Vis to understand if the peaks of absorption of the reagent and those of the final product are well separated and could potentially be monitored by a portable spectrophotometer to determine a positive result of the test.

The reaction was also monitored to understand if the peak associated with the blue product would be visible before the blue colour becomes visible with the naked eye, which could potentially shorten the time necessary to declare a positive result.

1,2-naphthoquinone has two peaks of maximum absorbance at 397 nm and 340 nm while the blue product has a broad characteristic peak at 584 nm. The peaks are very well separated. When the mixture of 1,2-naphthoquinone and $CuCl_2$ is analysed there is an additional peak around 251 attributable to $CuCl_2$.

Figure 5:
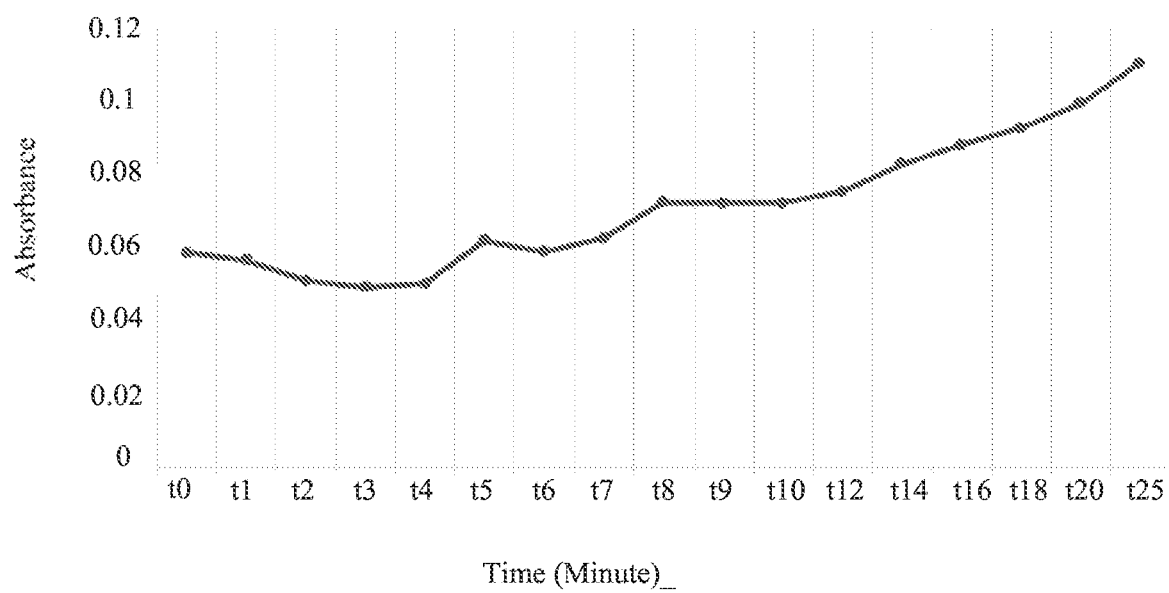
FIG. 5 shows the changes in the absorbance spectrum as the colour develops.

The monitoring of the absorbance at 584 nm for the reaction of 150 µg of fentanyl with the standard recommended amount of reagent can be seen in FIG. 5. For the first few minutes a drop in absorbance was observed, which can be possibly explained by the use of the small cuvette. At t5 a visible increase from t4 can be seen, but if the reading at t0 is considered, the increase is very small. A second small drop is visible at t6 and then an increase is seen from t7 onwards. It is therefore possible to detect an increase in absorbance, indicating that the reaction between fentanyl and 1,2-naphthoquinone is occurring, before the green colour is visible with the naked eye. With a more suitable instrument the increase would be more linear since the readings would be less influenced by external factors from the reaction, further investigation is therefore necessary to understand at what minute a test could be determined positive.

Other tests were performed to understand if a peak would be visible for an amount of fentanyl below the 15 µg LOD. Theoretically, when a low amount of fentanyl is present, it does react with 1,2-naphthoquinone but the blue colour of the product is not visible because it is masked by the yellow colour of large amounts of 1,2-naphthoquinone. A blank was tested alongside reagents mixed with 10, 15, 25 and 40 µg of fentanyl left to react for 15 minutes. The wavelength associated to the absorbance peak for the blue product was monitored. The blank was then compared to the responses of the mixtures to understand if a significant difference could be detected.

The reaction of a mixture of fentanyl (5%) and paracetamol was monitored with UV-Vis, paracetamol has been found to quench the reaction and no blue colour is visible to the naked eye.

When monitoring the reaction of 10 µg of fentanyl, a quantity found to be below the LOD of the test, no difference in absorbance at 584 nm was observed. The same was seen when monitoring the reaction of a mixture of fentanyl (5%) and paracetamol with 1,2-naphthoquinone. Paracetamol has been found to quench the reaction and no blue colour is visible to the naked eye, no significant increase in absorbance was observed either, only normal fluctuations of the baseline. A more sensitive instrument adapted to allocate a small cuvette would be necessary to carry out satisfactory experiments to understand if monitoring the absorbance at 584 nm could potentially detect the reaction below the 15 µg of fentanyl limit of detection or when other substances are present.

Figure 4:
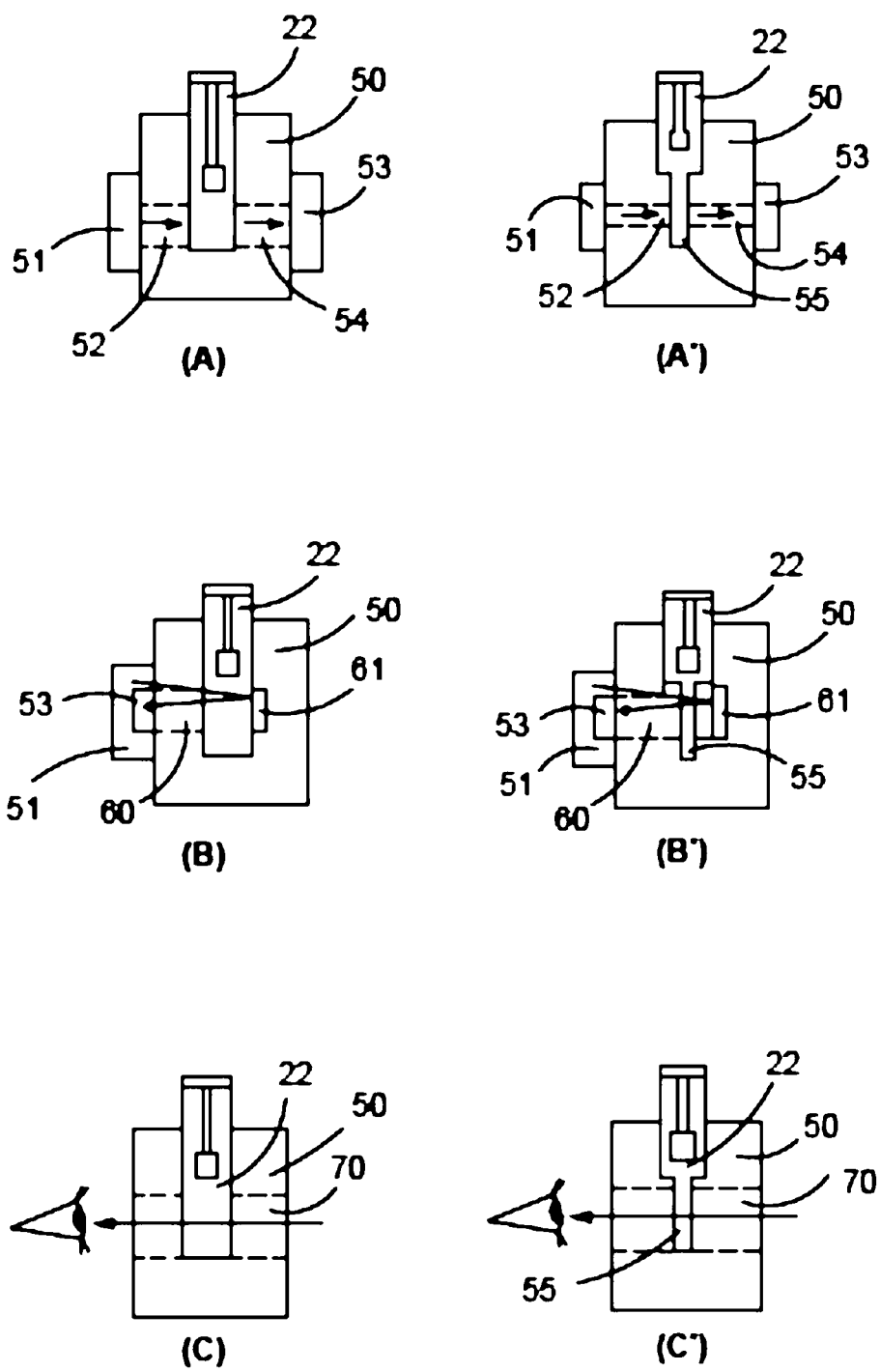
FIG. 4 shows a variety of exemplary configurations of devices of the present invention.

Non-limiting examples of some colorimetric analysis devices envisaged to be suitable for carrying out the tests of the present invention are shown in FIG. 4. In all the embodiments shown, the device 50 has a cavity designed to hold a sample tube 22 and an inspection window or windows configured to allow spectroscopic analysis of a relevant coloured section of the material contained in the tube. The cavity is configured so as to generally occlude the rest of the tube apart from the inspection window or windows. This functions so as to provide controlled light conditions inside the device.

The specific device in 4A and 4A' has two opposed windows to allow a light from a light source 51 to enter from a first window 52 and exit to a detector 53 at an opposed window 54. The detector could be any sort of visible detector, or even a simple RGB detector. In FIG. 4A, the tube 22 is of continuous cross section, whereas in 4A', it is of reduced cross section 55 at its lower end to accommodate the heavy organic phase with increased concentration of the coloured complex.

Alternatively, the device as shown in 4B and 4B' could have a single window 60 with an opposed reflective portion 62, where the light enters and exits via the same window 60, after passing twice through the sample, before entering detector 53. 3B' also has a region of reduced cross section 55.

Alternatively, the device as shown in 4C and 4C' could be configured for handheld use. The device has a through passage 70 to enable visual inspection of the tube 22 (or reduced portion 55) without interference. Light passing through the sample is simply observed with the naked eye. This embodiment could advantageously contain a reference sample for side-by-side comparison.

Colorimetric devices according to the present invention can be made in portable or mobile form, and the accompanying software can be configured to analyse the output of the RGB or other detector and provide simply a positive or negative result for the presence of fentanyl or a fentanyl analogue.

The invention claimed is:

1. A method of detecting the presence of fentanyl or a fentanyl analogue in a sample, the method comprising the step of contacting the sample with a reagent comprising a 1,2 naphthoquinone in a solvent and observing a colour change, which when present, correlates with the presence of fentanyl or a fentanyl analogue.

2. A method according to claim 1 wherein the 1,2-naphthoquinone is unsubstituted 1,2-naphthoquinone.

3. A method according to claim 1 wherein the solvent is a nitrile.

4. A method according to claim 1 wherein the solvent is acetonitrile.

5. A method according to claim 1 further comprising the-a step of adding a buffer to maintain an alkaline environment.

6. A method according to claim 5 wherein the buffer is added to the sample prior to contacting the sample with the reagent comprising a 1,2 naphthoquinone.

7. A method according to claim 5 wherein the buffer is sufficient to provide freebase fentanyl or a freebase fentanyl analogue.

8. A method according to claim 5 wherein the buffer is a phosphate buffer.

9. A method according to claim 1 wherein the reagent further includes a catalyst.

10. A method according to claim 9 wherein the catalyst is a metal halide.

11. A method according to claim 1 wherein the colour change is to green and occurs within 2 minutes of adding the sample to the reagent.

12. A method according to claim 1 wherein the colour change is to blue and occurs within 10 minutes of adding the sample to the reagent.

13. A method according to claim 1 wherein the method further comprises the step of exposing the reagent to a light source after the sample has been added.

14. A method according to claim 13 wherein the light source has enhanced emission at 365 nm.

15. A method according to claim 1 wherein the fentanyl or fentanyl analogue is a fentanyl analogue without a free OH group.

16. A reaction product of fentanyl and 1,2-naphthoquinine having the following structure:

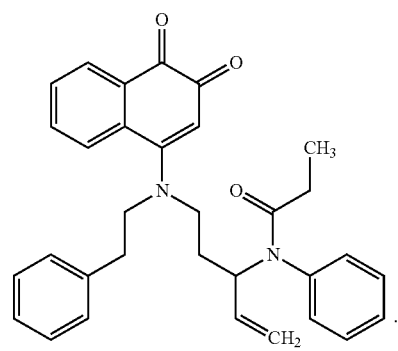 [SMILES: C=CC(CCN(CCc1ccccc1)C1=CC(=O)C(=O)c2ccccc21)N(C(=O)CC)c1ccccc1]

17. A method according to claim 1 wherein the sample is an unknown drug sample.

18. A method according to claim 1 wherein the method is used as a presumptive test for a suspected illicit substance, a suspected overdose, or in sport or workplace testing.

19. The method of claim 7, wherein the buffer is pH 8.

20. The method of claim 15, wherein the fentanyl analogue without a free OH group is β-hydroxyfentanyl.

\* \* \* \* \*